J. R. VAN TASSEL.
GOGGLES.
APPLICATION FILED JUNE 30, 1916.
1,208,410.
Patented Dec. 12, 1916.
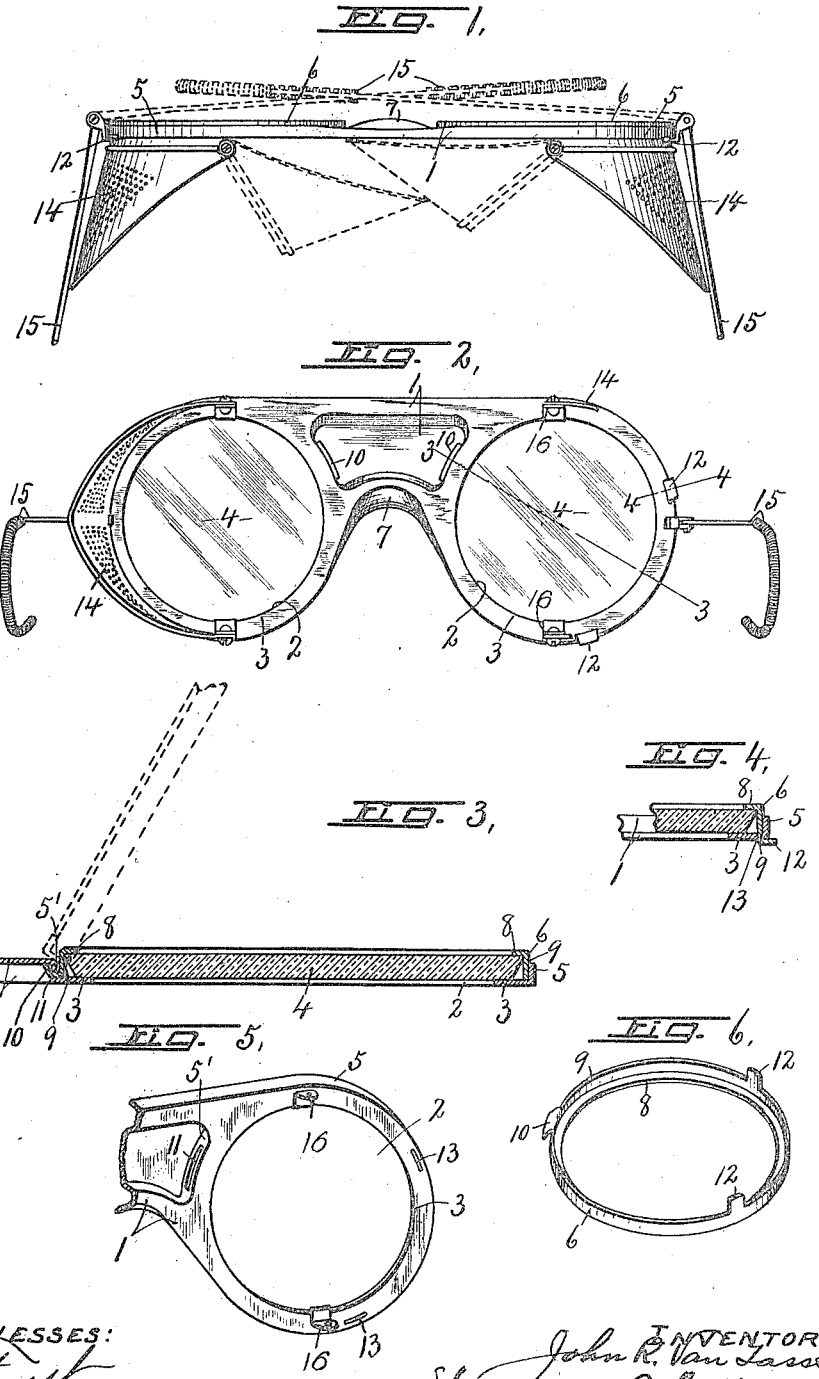

UNITED STATES PATENT OFFICE.

JOHN R. VAN TASSEL, OF GENEVA, NEW YORK, ASSIGNOR TO THE STANDARD OPTICAL COMPANY, OF GENEVA, NEW YORK, A CORPORATION OF NEW YORK.

GOGGLES.

1,208,410.      Specification of Letters Patent.      Patented Dec. 12, 1916.

Application filed June 30, 1916. Serial No. 106,793.

*To all whom it may concern:*

Be it known that I, JOHN R. VAN TASSEL, a citizen of the United States of America, and resident of Geneva, in the county of Ontario, in the State of New York, have invented new and useful Improvements in Goggles, of which the following, taken in connection with the accompanying drawings, is a full, clear, and exact description.

This invention relates to certain improvements in spectacle mountings, and refers more particularly to the class commonly known as workmen's goggles to be used in grinding, polishing, furnace work and other places where necessary to protect the eyes. They are, therefore, subjected to more or less rough usage, frequently resulting in the breakage of one or both of the glasses which are usually held in place by crimping the surrounding portion of the frame or mounting over and upon the edge thereof so that if the glass becomes broken, it is necessary to have it replaced by an optician or other person skilled in the art, the expense of which is often as great as the original cost of the entire outfit, to say nothing of the loss of the use of the goggles while undergoing repairs.

The main object, therefore, of my present invention is to hold the glasses in place in the frame by means of separate retaining rings detachably interlocked with the frame in such manner that the user may easily and quickly replace a broken lens without material loss of time, or greater expense than the cost of the glass, it being understood that the purchaser of the original goggles may obtain and have on hand one or more extra glasses for use in case of breakage, said glasses being made of standard circular sizes to permit them to be interchanged from one side to the other.

Other objects and uses relating to specific parts of the mounting will be brought out in the following description.

In the drawings—Figures 1 and 2 are, respectively, a top plan and a rear elevation of a spectacle mounting or goggle embodying the features of my invention. Figs. 3 and 4 are enlarged sectional views taken, respectively, on lines 3—3 and 4—4, Fig. 2. Fig. 5 is a perspective view of one side of the main frame. Fig. 6 is a perspective view of one of the glass-retaining rings.

As illustrative, this mounting comprises a main supporting frame —1— which is preferably made of a single piece of thin sheet metal stamped to the desired form to produce circular sight openings —2— of the same diameter and the desired pupilary distance apart from center to center, and circular marginal seats —3— surrounding the openings in substantially the same flat plane and upon which the transparent mediums, as the circular glasses —4—, are adapted to rest, said frame being also provided with relatively narrow outstanding flanges —5— projecting forwardly from the outer edges of the seats —3— at substantially right angles thereto to form correspondingly shallow sockets for the reception and radial retention of circular glass-retaining rings —6—. The central lower portion of the frame between the circular seats —3— is arched upwardly at —7— and its lower edge rounded in cross section to comfortably rest upon the bridge of the nose, while the upper edge of the frame is preferably straight and tangential to the upper edges of the circular seats —3—, as shown more clearly in Fig. 2, the flange —5— being continued along said straight edge to reinforce this portion of the frame against buckling. The intermediate portion of the frame between the bridge —7— and upper edge is depressed forwardly in such manner that the outline of the depression will follow closely the adjacent portions of the circular seats —3—, bridge —7— and upper straight edge of the frame to not only allow brow space above the bridge, but also to further reinforce the frame and provide continuations —5'— of the flange —5— at the inner side of the glasses, and furthermore to provide means for attachment of one side of the glass-retaining rings —6— to the frame, as will be hereinafter more fully described. These glass-retaining rings are also made of thin sheet metal circular in form and angular in cross section and of just sufficient external diameter to easily fit within the marginal flange —5—, each ring being provided with a circular lens-seat —8—, and an annular flange —9— projecting rearwardly from the outer edge of the circular seat —8— and entirely surrounding the marginal edge of the lens to protect such edge from breakage as the ring with the lens therein is moved into and out of the socket. The sockets in which the lens-retaining rings are mounted open outwardly or forwardly away from the eyes so as to prevent any possibility of the glass and its retaining ring being forced inwardly against the eyes by contact with external objects, and at the same time permitting either ring and glass to be easily and quickly removed by outward displacement whenever necessary, as for example in replacing a broken glass, thus permitting repeated use of the same frame and rings.

Suitable means is provided for detachably interlocking the retaining rings with the frame, and for this purpose each ring is provided at one side with a hook-shaped tongue —10— integrally united at one end to the inner edge of the adjacent portion of the flange —9— from which it is folded partially across the outer face of said flange a slight distance therefrom to enable it to enter a slot —11— in the flange —5'— at the inner side of the sight-opening in the frame, as shown in Figs. 3 and 5, thereby producing a detachable hinge connection holding this side of the ring against outward displacement from said frame, the opposite or outer side of the ring being also provided with one or more, in this instance two, additional tongues —12— projecting from the inner edge of the flange —6— and adapted to enter corresponding slots —13— in the annular lens-rest —3— of the frame, said tongues —12— being of sufficient length to pass entirely through and slightly beyond the inner face of the lens-rest or flange —3— to permit their inner ends to be bent outwardly against the inner face of the frame for retaining this portion of the ring in operative position, the metal from which the rings are formed being easily bendable by the fingers. The purpose in bending the fingers —12— outwardly is to avoid interference with the adjustment of the side guards or shields, as —14—, with which the lens frame is provided.

It is now clear that if a lens or glass should break, the ring retaining the same in the frame may be easily and quickly detached by simply bending the ends of the tongues —12— to their initial positions in line with the flange —6—, whereupon this portion of the lens and retainer may be pushed forwardly by the fingers to approximately the position indicated by dotted lines in Fig. 3, when the hook-shaped member —10— may be displaced from the slot —11— by the movement of the retaining ring toward the center of the sight opening. The broken glass will then be removed and a new one placed on the seat —3— of the frame or in the retainer ring, whereupon said ring may be readjusted to its operative position and held in the manner previously described.

The entire frame is held in operative position by the bridge —7— and suitable ear-pieces —15—. The side guards or shields —14— may be made of perforated sheet metal or screen wire, and are preferably hinged at their inner ends to ears or lugs —16— on diametrically opposite sides of the annular seats or flanges —3—, and preferably integral therewith, as shown in Fig. 5, while the outer edges of the bases thereof may be held against the frame by any of the well-known forms of spring-catches, not necessary to herein illustrate or describe, because the manner of attaching the shields forms no part of my present invention, which, as previously explained, relates more particularly to the means for retaining the glasses in the frame. Another advantage in holding the glass in place by a detachable retaining ring is that the glass may be readily changed from clear to colored or vice versa if desired, thus permitting the dealer to supply a widely varied demand for glasses without carrying in stock a corresponding number of frames.

It will be observed in the present device that the glass is loosely mounted in the retainer ring to be readily displaced or reinserted, but it is evident that the edge of the ring may be crimped over and upon the edge of the glass to retain it in place, and the lens and ring sold and used as a unit without departing from the spirit of my invention.

What I claim is:

1. In a lens mounting for spectacles, a frame having a pair of lens-receiving sockets, in combination with a pair of lenses and retaining rings therefor surrounding the marginal edges thereof and closely fitting within the sockets to protect the edges of the lens from contact with the peripheral walls of said sockets.

2. In a lens mounting for spectacles, a frame having a pair of lens-receiving sockets, in combination with a pair of lenses and retaining rings therefor surrounding the marginal edges thereof and closely fitting within the sockets, and movable members for locking and releasing the rings upon and from the frame.

3. In a lens mounting for spectacles, a frame having a pair of lens-receiving sockets, in combination with a pair of lens-retaining rings telescoping within the sockets and having detachable hinge connections with the walls thereof.

4. In a lens mounting for spectacles, a frame having a pair of lens-receiving sockets, in combination with a pair of lens-retaining rings telescoping within the sockets and having detachable hinge connections with the frame at the inner sides of the sockets.

In witness whereof I have hereunto set my hand this 16th day of June, 1916.

JOHN R. VAN TASSEL.

Witnesses:
ALBION W. NEWELL,
H. A. HERENDUN.

Copies of this patent may be obtained for five cents each, by addressing the "Commissioner of Patents, Washington, D. C."